(12) United States Patent
Welle et al.

(10) Patent No.: US 11,022,475 B2
(45) Date of Patent: Jun. 1, 2021

(54) FILL LEVEL RADAR DEVICE HAVING AUTOMATED FREQUENCY ADJUSTMENT

(71) Applicant: VEGA GRIESHABER KG, Wolfach (DE)

(72) Inventors: Roland Welle, Hausach (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 349 days.

(21) Appl. No.: 16/014,634

(22) Filed: Jun. 21, 2018

(65) Prior Publication Data

US 2018/0372529 A1 Dec. 27, 2018

(30) Foreign Application Priority Data

| Jun. 21, 2017 | (DE) | 10 2017 210 381.7 |
| Jun. 21, 2017 | (DE) | 10 2017 210 382.5 |
| Jun. 21, 2017 | (DE) | 10 2017 210 383.3 |
| Jun. 21, 2017 | (DE) | 10 2017 210 402.3 |
| Jun. 21, 2017 | (EP) | 17177111 |
| Jun. 21, 2017 | (EP) | 17177147 |

(51) Int. Cl.

| *G01F 23/284* | (2006.01) |
| *G01S 7/40* | (2006.01) |
| *G01S 13/88* | (2006.01) |
| *H01Q 1/22* | (2006.01) |

(Continued)

(52) U.S. Cl.
CPC .......... *G01F 23/284* (2013.01); *G01S 7/4008* (2013.01); *G01S 13/88* (2013.01); *H01Q 1/225* (2013.01); *H01Q 13/02* (2013.01); *G01S 2007/4013* (2013.01)

(58) Field of Classification Search
None
See application file for complete search history.

(56) References Cited

U.S. PATENT DOCUMENTS

| 4,044,354 A | 8/1977 | Bosher et al. |
| 4,044,355 A | 8/1977 | Edvardsson |
| 4,210,023 A | 7/1980 | Sakamoto et al. |

(Continued)

FOREIGN PATENT DOCUMENTS

| CN | 1041654 A | 4/1990 |
| CN | 1113003 A | 12/1995 |

(Continued)

OTHER PUBLICATIONS

No author given, "Rosemount Guided Wave Radar Transmitters in Upstream Applications: Best Practices User Guide"; Reference Manual 00809-0600-4811, Rev. AA; Feb. 2009; published by Rosemount Measurement, Chanhassen, MN, USA. (Year: 2009).*

(Continued)

*Primary Examiner* — Bernarr E Gregory
(74) *Attorney, Agent, or Firm* — Oblon, McClelland, Maier & Neustadt, L.L.P.

(57) ABSTRACT

A fill level radar device including a signal source assembly, an operating parameter determination circuit and an operating parameter adjustment circuit that is designed to change a sweep parameter of a continuous wave transmission signal on the basis of a characteristic variable of a measurement environment or measurement sequence that is input by the user or detected by the measurement device.

17 Claims, 8 Drawing Sheets

(51) Int. Cl.
*H01Q 13/02* (2006.01)
*G01S 13/00* (2006.01)

(56) References Cited

U.S. PATENT DOCUMENTS

| | | | |
|---|---|---|---|
| 4,503,433 A | 3/1985 | Tomasi | |
| 4,661,817 A | 4/1987 | Bekkadal et al. | |
| 4,847,623 A * | 7/1989 | Jean | G01F 23/284 342/124 |
| 5,406,842 A | 4/1995 | Locke | |
| 5,440,310 A * | 8/1995 | Schreiner | G01F 23/284 342/124 |
| 5,629,706 A | 5/1997 | Bååth | |
| 6,107,957 A | 8/2000 | Cramer et al. | |
| 6,122,602 A | 9/2000 | Michalski | |
| 6,486,826 B1 | 11/2002 | Cramer | |
| 6,684,696 B2 * | 2/2004 | Schultheiss | G01F 23/284 73/290 R |
| 6,864,833 B2 * | 3/2005 | Lyon | G01S 7/4008 342/124 |
| 7,363,812 B2 * | 4/2008 | Eriksson | G01F 23/284 73/290 V |
| 7,460,057 B2 * | 12/2008 | Fehrenbach | G01F 23/284 342/124 |
| 8,276,444 B2 * | 10/2012 | Malinovskiy | G01F 23/284 73/290 V |
| 8,319,680 B2 | 11/2012 | Sai | |
| 8,497,799 B2 | 7/2013 | Kleman | |
| 8,872,694 B2 | 10/2014 | Edvardsson et al. | |
| 9,291,443 B2 | 3/2016 | Kleman et al. | |
| 9,329,074 B2 * | 5/2016 | Sai | G01F 23/284 |
| 9,389,113 B2 | 7/2016 | Jirskog et al. | |
| 9,395,229 B2 | 7/2016 | Jirskog et al. | |
| 9,506,796 B2 | 11/2016 | Edvardsson | |
| 9,541,444 B2 | 1/2017 | Kleman | |
| 9,793,951 B2 * | 10/2017 | Henry | H04B 3/54 |
| 10,260,928 B2 * | 4/2019 | Welle | G01F 23/284 |
| 10,310,056 B2 * | 6/2019 | Hughes | G01F 23/284 |
| 10,416,021 B2 | 9/2019 | Gorenflo et al. | |
| 10,422,682 B2 * | 9/2019 | Hengstler | G01F 23/284 |
| 10,473,509 B2 * | 11/2019 | Hengstler | G01F 23/284 |
| 2005/0052314 A1 | 3/2005 | Spanke et al. | |
| 2005/0166671 A1 | 8/2005 | Peterson et al. | |
| 2005/0168379 A1 | 8/2005 | Griessbaum et al. | |
| 2006/0044145 A1 * | 3/2006 | Akerstrom | G01F 23/284 340/612 |
| 2008/0282793 A1 * | 11/2008 | Jirskog | G01F 23/284 73/292 |
| 2009/0033543 A1 * | 2/2009 | Nilsson | G01F 23/284 342/124 |
| 2011/0163910 A1 | 7/2011 | Sai | |
| 2011/0248725 A1 | 10/2011 | Mukherjee | |
| 2012/0130509 A1 * | 5/2012 | Altendorf | G01F 23/284 700/30 |
| 2012/0169528 A1 | 7/2012 | Edvardsson | |
| 2012/0242530 A1 | 9/2012 | Luebbert et al. | |
| 2012/0299767 A1 | 11/2012 | Kleman | |
| 2012/0299768 A1 * | 11/2012 | Griessbaum | G01F 23/284 342/124 |
| 2013/0213132 A1 | 8/2013 | Wegemann | |
| 2014/0253147 A1 | 9/2014 | Kleman et al. | |
| 2014/0253366 A1 | 9/2014 | Kleman | |
| 2014/0298885 A1 | 10/2014 | Criel et al. | |
| 2015/0116142 A1 | 4/2015 | Jirskog | |
| 2015/0160066 A1 | 6/2015 | Sai | |
| 2015/0177163 A1 | 6/2015 | Edvardsson | |
| 2015/0253176 A1 | 9/2015 | Jirskog et al. | |
| 2015/0276462 A1 | 10/2015 | Kleman | |
| 2015/0338261 A1 * | 11/2015 | Mueller | G01F 23/284 342/124 |
| 2016/0103006 A1 | 4/2016 | Edvardsson | |
| 2016/0115784 A1 | 4/2016 | Littleford et al. | |
| 2016/0146658 A1 | 5/2016 | Littleford | |
| 2018/0031687 A1 | 2/2018 | Mueller | |
| 2018/0164145 A1 | 6/2018 | Daufeld et al. | |
| 2018/0262319 A1 | 9/2018 | Xing | |
| 2018/0328771 A1 | 11/2018 | Edvardsson | |
| 2020/0249068 A1 | 8/2020 | Michalski | |

FOREIGN PATENT DOCUMENTS

| | | |
|---|---|---|
| CN | 1234509 A | 11/1999 |
| CN | 101140180 A | 3/2008 |
| CN | 101322015 A | 12/2008 |
| CN | 101485074 A | 7/2009 |
| CN | 101492750 A | 7/2009 |
| CN | 101666668 A | 3/2010 |
| CN | 202382811 U | 8/2012 |
| CN | 102763001 A | 10/2012 |
| CN | 102798436 A | 11/2012 |
| CN | 103017868 A | 4/2013 |
| CN | 104713617 A | 6/2015 |
| CN | 104897242 A | 9/2015 |
| CN | 104977063 A | 10/2015 |
| CN | 105102942 A | 11/2015 |
| CN | 205037943 U | 2/2016 |
| DE | 694 33 175 T2 | 6/2004 |
| DE | 10 2009 057 191 A1 | 6/2011 |
| DE | 10 2015 109 463 A1 | 12/2016 |
| EP | 0 928 974 A2 | 7/1999 |
| EP | 1 707 982 A1 | 10/2006 |
| EP | 1 707 983 A1 | 10/2006 |
| EP | 1 992 922 A2 | 11/2008 |
| EP | 1 992 923 A2 | 11/2008 |
| EP | 2 166 671 A2 | 3/2010 |
| EP | 2 293 096 A2 | 3/2011 |
| EP | 2 631 612 A2 | 8/2013 |
| EP | 2 491 355 B1 | 12/2017 |
| JP | 2013-253937 | 12/2013 |
| KR | 10-2015-0126532 | 11/2015 |

OTHER PUBLICATIONS

No author given, "Rosemount 5300 Series: Commissioning and Validation Procedures for Rosemount Radar"; Reference Manual 00809-1600-4530, Rev. AA; Mar. 2015; published by Rosemount Measurement, Chanhassen, MN, USA. (Year: 2015).*
U.S. Office Action dated Jul. 9, 2020 in co-pending U.S. Appl. No. 16/008,456 (15 pgs.).
T. Saito, et al., "An FM-CW radar module with front-end switching heterodyne receiver", IEEE MTT-S Digest, T-2, vol. 2, XP032363243A, 1992, pp. 713-716.
Office Action dated May 15, 2020 in co-pending U.S. Appl. No. 16/014,501, 9 pages.
Office Action dated Apr. 15, 2020 in co-pending U.S. Appl. No. 16/011,274, 13 pages.
Notice of Allowance dated Sep. 3, 2020 in co-pending U.S. Appl. No. 16/014,501 (11 pgs.).
U.S. Office Action dated Sep. 22, 2020 in co-pending U.S. Appl. No. 16/011,274 (13 pgs.).
U.S. Office Action dated Oct. 6, 2020 in co-pending U.S. Appl. No. 16/014,680, 11 pgs.
Office Action dated Feb. 4, 2021 in co-pending U.S. Appl. No. 16/011,274; 14 pgs.
Office Action dated Mar. 22, 2021 in China Patent Application No. 201810643215.3 with English translation; 15 pgs.
Office Action dated Mar. 24, 2021 in China Patent Application No. 201810629191.6 with English translation; 16 pgs.
Office Action dated Mar. 24, 2021 in China Patent Application No. 201810642348.9 with English translation; 21 pgs.
Office Action dated Mar. 23, 2021 in China Patent Application No. 201810646168.8 with English translation; 19 pgs.
Office Action dated Mar. 26, 2021 in China Patent Application No. 201810643156.X with English translation; 16 pgs.

* cited by examiner

FILL LEVEL RADAR DEVICE HAVING AUTOMATED FREQUENCY ADJUSTMENT

CROSS-REFERENCE TO RELATED APPLICATIONS

This application claims the benefit of the filing date of European Patent Applications No. 17 177 111.6 filed on 21 Jun. 2017 and No. 17 177 147.0 filed on 21 Jun. 2017, the entire contents of each of which are hereby incorporated herein by reference and of German Patent Applications No. 10 2017 210 383.3 filed on 21 Jun. 2017, No. 10 2017 210 381.7 filed on 21 Jun. 2017, No. 10 2017 210 382.5 filed on 21 Jun. 2017 and No. 10 2017 210 402.3 filed on 21 Jun. 2017, the entire contents of each of which are hereby incorporated by reference.

FIELD

The embodiments relate to fill level measurement technology. The embodiments relate in particular to a fill level radar device, to a method for fill level determination, to a program element and to a computer-readable medium.

BACKGROUND

Fill level radar devices determine the fill level from the delay time of electromagnetic waves that are transmitted by the measurement device as a transmission signal and are received again at the filling material following reflection. A spacing between the measurement device and the filling material can be determined from the delay time of the electromagnetic waves, and in turn a degree of filling of a container provided with the measurement device can be determined from said spacing.

The electromagnetic waves may be high-frequency waves or microwaves. Said waves may be emitted freely from the measurement device towards the filling material or, alternatively, may be conducted there and back by a waveguide.

Various measurement methods are known for measuring the delay time of electromagnetic waves between the transmission thereof and the reception thereof. In principle, said methods can be differentiated into methods that measure the delay time of very short transmission pulses, usually referred to as pulse radar, and measuring principles that are based on the modulation of continuously transmitted signals. Said signals are also referred to as continuous wave signals, and the corresponding fill level radar devices are referred to as CW (Continuous Wave) radar devices for example, which devices continuously transmit throughout the duration of a measurement procedure, with the result that, in contrast to pulsed methods, the transmission duration within one measurement cycle is typically orders of magnitude longer than the delay time of the signals themselves.

In this case, the delay time can be determined indirectly by modulating the transmitted and received waves. In the case of FMCW (Frequency Modulated Continuous Wave) methods, linear frequency modulation, also referred to as a frequency sweep, is used for this purpose.

Under specific conditions, it is possible, by increasing the emitted transmission power, to improve the signal-to-noise ratio of the transmission signal that is received after being reflected on the filling material.

SUMMARY

The present disclosure describes further increase the measuring accuracy of fill level radar devices.

The described embodiments, together with further advantages, will be best understood by reference to the following detailed description taken in conjunction with the accompanying drawings. A described embodiment relates to a fill level radar device comprising a signal source assembly that is designed to generate an electromagnetic transmission signal, the duration of which is more than twice the delay time of the transmission signal from the signal source assembly to the filling material. The electromagnetic transmission signal can in particular be what is known as a continuous wave transmission signal (CW signal). An operating parameter determination device, such as a circuit or processor, is provided which is designed to determine a new sweep parameter of the continuous wave transmission signal taking into account user input or information detected by the fill level radar device.

Furthermore, an operating parameter adjustment means, such as a circuit or processor, is provided which may be a separate component part or which is integrated in the operating parameter determination device and which is designed to change the sweep parameter of the continuous wave transmission signal to the new sweep parameter. In particular, the sweep parameter can be changed during normal measurement operation of the fill level measurement device. The sweep parameter is for example a parameter that relates to the frequency ramp of the transmission signal, for example the sweep time of the continuous wave transmission signal, the bandwidth thereof, the starting frequency or end frequency thereof, the number of intermediate frequency steps of the continuous wave transmission signal, or the power thereof, which parameters can be set depending on the frequency of the continuous wave transmission signal for example. In particular, the transmission power of the transmission signal may be dependent on the frequency of the transmission signal, i.e. may vary across the continuous frequency band.

The sweep parameter of the continuous wave transmission signal may, however, also be a parameter that has nothing to do with the actual sweep, for example the number of sampling values to be detected per frequency step, or the sampling rate, which parameters may be significant for the efficiency of the fill level radar device.

In particular, the fill level radar device may be designed to change a plurality of said sweep parameters during operation of the fill level radar device.

Said changes are triggered by the operating parameter determination means consulting information input by a user and/or information detected by the fill level radar device, said determination means determining the new sweep parameters from said information. This information may in particular be one or more characteristic variables of the measurement environment or the measurement sequence. Examples thereof are information regarding the type of filling material (solid, liquid, etc.), the type of measurement set-up (open measurement environment or measurement in a container, vertical pipe measurement or free beam measurement, etc.), or information regarding an expected rate of change of the fill level or expected level differences.

According to another described embodiment, the fill level radar device comprises a transceiver circuit that is designed to transmit the continuous wave transmission signal towards the filling material surface and to receive the corresponding reflected transmission signal, and to then mix said signal with a further signal in order to form a reflection-dependent reception signal from which the fill level can then be determined. In this connection, reference is made either to homodyne or heterodyne mixing, depending on whether the received transmission signal is mixed with "itself" or with another signal that is typically also of a different frequency.

According to another described embodiment, the continuous wave transmission signal has a frequency that is constant in portions, the individual frequencies being distributed, for example equidistantly, within a defined frequency band.

According to a described embodiment, the fill level radar device is designed to be connected to a 4 to 20 mA two-wire loop via which the fill level radar device is supplied with the power required for the measurement and via which the device transmits measurement data and can receive parameterisation data from an external location.

A further embodiment relates to a method for fill level determination in which an electromagnetic continuous wave transmission signal is generated, the duration of which is more than twice the delay time of the transmission signal from the signal source assembly to the filling material. Thereupon, a new sweep parameter of the continuous wave transmission signal is determined taking into account user input or information detected by the fill level radar device, and the sweep parameter of the continuous wave transmission signal is amended to the new sweep parameter.

Of course, a plurality of sweep parameters could also be changed.

A further embodiment relates to a program element which, when executed on a processor of a fill level radar device, instructs the fill level radar device to carry out the steps described above and in the following.

Another embodiment relates to a computer-readable medium, on which the above-described program element is stored.

At this point, it should be noted that the features of the fill level radar device disclosed above and in the following may also be implemented as method steps, and that the features of the method described within the context of the invention can also be implemented in the fill level radar device.

A basic concept of the embodiments can be considered to be that of optimising the transmission frequencies emitted by a fill level radar device in order, for example, to increase the measuring accuracy. Pre-programmed knowledge can allow the operating parameter determination means in the fill level radar device which operates in accordance with the continuously or stepwise modulated FMCW method or in accordance with the reflectometer principle to optimise the characteristic variables (sweep parameters) of the transmission signal used for the measurement, taking account of the application parameters input by the user and/or self-learnt characteristic variables of the measuring application.

BRIEF DESCRIPTION OF THE FIGURES

Embodiments are described in the following with reference to the drawings. Where the same reference signs are used in the drawings, said signs denote the same or similar elements. The drawings are schematic and not to scale.

DETAILED DESCRIPTION OF EMBODIMENTS

Figure 1:
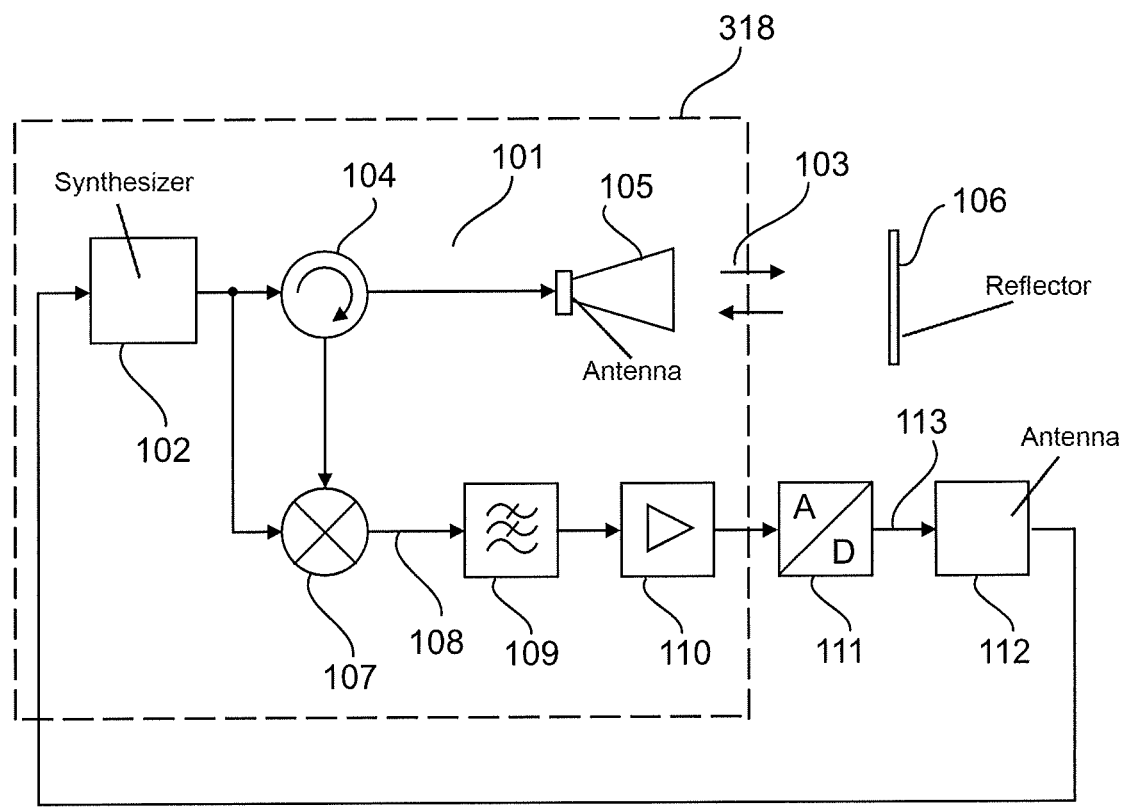
FIG. 1 is a circuit diagram of a fill level radar device.
Figure 2:
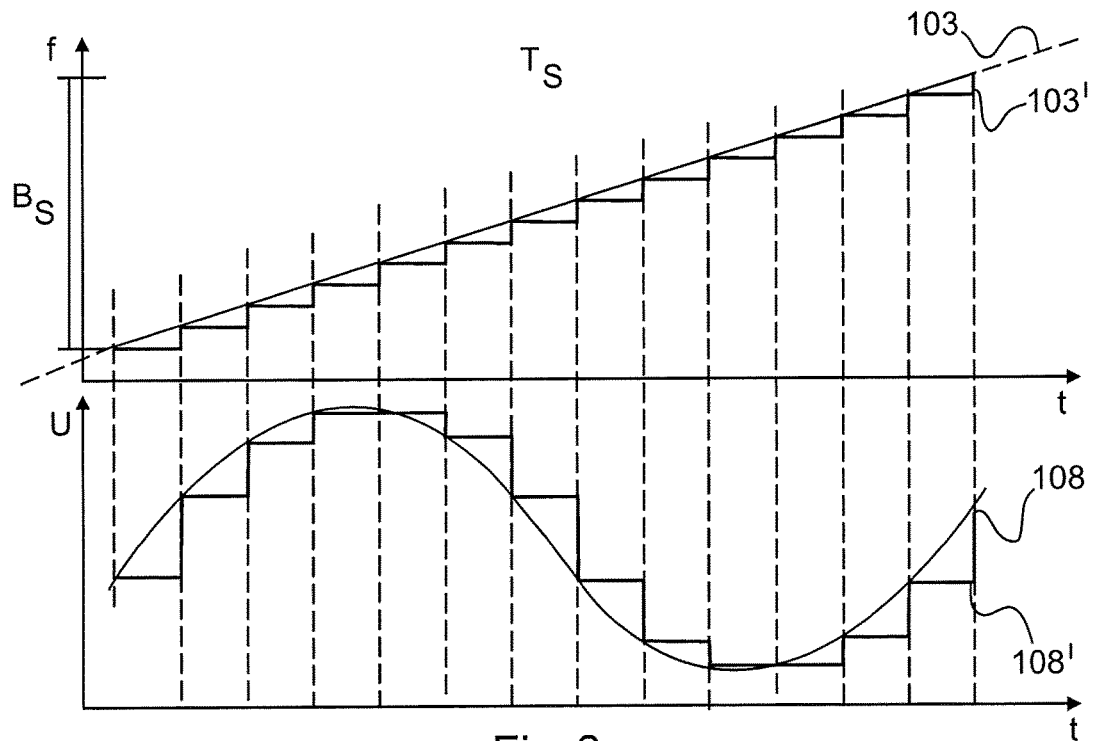
FIG. 2 shows examples of transmission signals and the corresponding reflection-dependent reception signals.

FIG. 1 is a highly simplified circuit diagram showing the fundamental design of a transceiver circuit 101 of an FMCW radar sensor. The synthesiser 102 is used for generating the transmission signal 103 and contains for example a VCO (voltage controlled oscillator) for this purpose. The transmission signal undergoes linear frequency modulation by means of a circuit, for example a PLL circuit (phase-locked loop), contained in the synthesiser 102, for controlling the transmission frequency. Said transmission signal 103 reaches the antenna 105 via the circulator 104 and is transmitted therefrom towards the reflector 106. The reception signal that returns to the antenna 105 following the reflection reaches the mixer 107 via the circulator 104. Said mixer mixes the reception signal with a portion of the transmission signal, resulting in what is known as a beat signal 108. Following low-pass filtering in the filter 109 and corresponding amplification in the amplifier 110, said beat signal is digitalised by an analogue-to-digital converter 111 and then further processed digitally. In this case, mixing the transmission and reception signals is what is known as a homodyne receiver principle. The distance between the reflector 106 and the measurement device has a direct effect on the frequency of the beat signal 108, and therefore, vice versa, the measurement distance can be concluded directly from the measured beat frequency. In the case of a plurality of reflectors, a beat signal 108 results that has a frequency composition of individual frequencies associated with the different measurement distances. It is therefore conventional for the digitalised beat signal to undergo spectral analysis within a controller circuit 112, for example using a Fourier transform or a fast Fourier transform (FFT), in order to separate the individual frequency portions or reflection portions and optionally to precisely determine said portions with regard to the frequency thereof and thus the basic measurement distance. FIG. 2 is a time-frequency graph of a detail of the transmission signal 103 with linear frequency modulation, and directly therebelow by way of example a time-voltage graph of an associated analogue beat signal 108 that results at a defined reflector distance.

A known variant of the FMCW method is that of modifying the linear frequency modulation of the transmission signal into a stepped linear frequency modulation, as shown as an alternative 103' in FIG. 2. In this case, the transmission signal 103' stands at a specific frequency for a certain time period and then jumps, in uniform steps, onwards to the next frequencies. The homodyne mixing in accordance with the block diagram from FIG. 1, which is valid in this case too, results, at the mixer output, in a DC voltage for each frequency step, which voltage results from the mutual phase shift between the transmission signal and the reception signal. The DC voltages resulting from each step produce, in succession, a signal curve 108' in accordance with the beat frequency 108 of the above-described FMCW method. This is likewise shown schematically, in portions, in FIG. 2. As is clear from the drawing, the previously continuous beat signal 108 is converted into a stepped analogue signal 108'. In the event of subsequent analogue-to-digital conversion of said stepped signal 108', it is of course expedient to convert exactly one sampling value per step, with the result that the digitalised beat signal of the stepped linear frequency modulation does not substantially differ from the digitalised beat signal of a standard FMCW method. The further digital signal processing, beginning with the spectral analysis, is therefore identical in both methods.

Characteristic variables when operating a radar measurement device in accordance with the FMCW method (also known as operating parameters) are the bandwidth $B_S$ passed through during a frequency sweep and the sweep time $T_S$ required therefor. Furthermore, the specification of the sampling frequency $f_A$ of the A/D converter 111 may be significant for the efficiency of the radar system. In general, increasing the bandwidth $B_S$ can improve the differentiation between echoes that are very close together. Increasing the sweep time $T_S$ leads to an improvement in the signal-to-noise ratio, and increasing the sampling rate $f_A$ of the A/D converter makes it possible to increase the maximum detectable measuring range.

Figure 3:
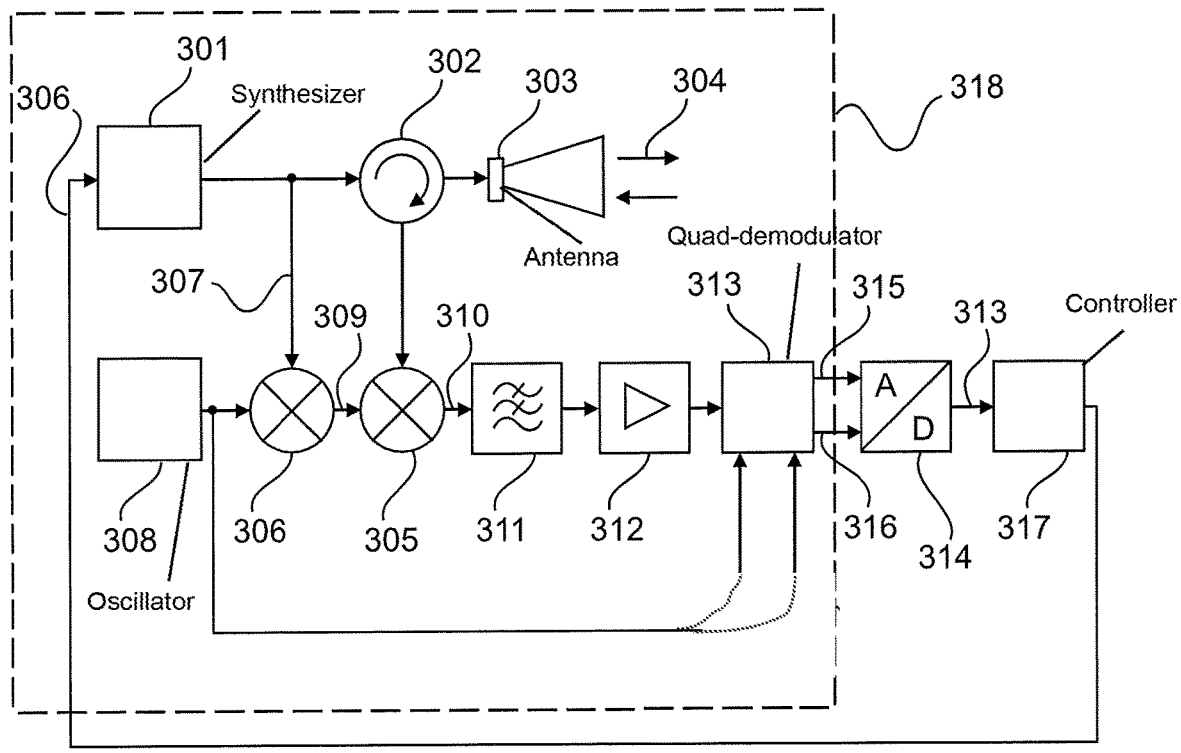
FIG. 3 is a circuit diagram of a further fill level radar device.

FIG. 3 is a block diagram of an alternative measurement method to the known FMCW method described above, which alternative method is also referred to in the following as the reflectometer method. Said diagram differs from the transceiver circuit 101 shown in FIG. 1 inter alia on account of a heterodyne circuit design that provides reception mixing of the received signal with a local oscillator signal of a different frequency, such that an intermediate frequency results at the mixer output. Just as in FIG. 1, the synthesiser 301 generates a transmission signal which is guided via the circulator 302 or directional coupler 302 to the antenna 303 and is emitted thereby. In the process, the antenna 303 converts a high-frequency signal supplied via a line into an electromagnetic wave 304 which is either emitted freely or alternatively guided towards the reflector by means of a waveguide, for example a hollow waveguide or single-wire or stranded conductor. The wave reflected at the reflector returns, at least in part, to the antenna 303 and is converted back into a line-guided reception signal. Said signal then reaches the receiving mixer 305 via the circulator 302 or directional coupler 302. The circulator or directional coupler 302 is a known component part in the field of radar fill level measurement and can advantageously be used in monostatic operation, i.e. when using the same antenna for transmitting and receiving. Said component part comprises at least 3 ports and guides signals, in a direction-selective manner, from one port predominantly to a second port, while the third port is decoupled in this case. In the case of bistatic operation, which is likewise possible but is not shown in greater detail here, two separate antennae are used for transmitting and receiving. In this case, the circulator or directional coupler 302 is omitted and the signal reaches the transmitting antenna from the synthesiser 301 and reaches the receiving mixer 305 from the receiving antenna.

The synthesiser 301 is used for generating different sine waves of different frequencies in a previously specified frequency band, the frequency standing at a fixed value for a certain time period and then jumping to a new fixed frequency value. This may occur in the form of stepped linear frequency modulation, for example. For this purpose, said synthesiser contains a tuneable oscillator, for example a VCO. In addition, said synthesiser advantageously contains a control loop and a reference oscillator. The control loop, for example a PLL (phase-locked loop), controls the frequency of the tuneable oscillator so as to be in a specified, settable ratio to the frequency of the reference oscillator. The frequency ratio is advantageously set digitally, for example via the signal 306 in a manner controlled by a controller circuit 317, and usually involves switching one or more divider components that divide down the frequency of the reference oscillator and/or of the tuneable oscillator. In this case, non-integer dividers, known as fractional-N dividers, are also possible in addition to simple integer dividers. Using dividers of this kind makes it possible to adjust the output frequency of the synthesiser 301 in very small steps over a relatively large frequency range.

A portion of the output signal of the synthesiser 301 is branched off, for example via a power splitter or a coupler (not shown in greater detail), in order to form the local oscillator signal for the receiving mixer 305. For this purpose, the mixer 306 mixes the branched synthesiser signal 307 with an output signal of an oscillator 308, resulting in various new frequency portions such as the sum frequency and the difference frequency from the two input frequencies.

The output signal of the mixer 306 is used as the local oscillator signal for heterodyne reception mixing in the receiving mixer 305.

Inter alia, the difference frequency of the two signals results in the receiving mixer 305, from the local oscillator signal and the reception signal. In addition to the above-mentioned fixed frequency, said output signal of the receiving mixer 305, referred to as the intermediate frequency signal 310, has a phase position which, together with the amplitude of the intermediate frequency signal, defines a complex characteristic variable of the reflection coefficient of all the reflectors involved in reflecting the wave. In other words, the phase position of the intermediate frequency signal is dependent on the mutual phase position of the local oscillator signal and the reception signal. In turn, the phase position of the reception signal depends on the path travelled by the transmitted or received wave and thus on the reflector distance, while the phase position of the local oscillator signal depends on the synthesiser output signal and thus the transmitted signal. The phase position of the intermediate frequency signal is therefore ultimately dependent only on the phase shift between the transmission signal and the reception signal, and thus on the reflector distance. Said intermediate frequency signal undergoes band filtering in the band-pass filter 311 and is amplified in the intermediate frequency amplifier 312 in order to increase the signal-to-noise ratio. In order to determine the complex reflection coefficient from the intermediate frequency signal that is present in analogue form, it is possible, using a quadrature demodulator 313, to split the intermediate frequency signal into the complex constituents thereof, i.e. the real and imaginary part, and for the two portions to subsequently undergo analogue-to-digital conversion separately. An advantage of using the quadrature demodulator is that the real and imaginary part of the intermediate frequency signal are present as baseband signals 315, 316, i.e. no longer contain any high frequency portions and are therefore very easy to digitalise.

As already mentioned, following the analogue-to-digital conversion using the analogue-to-digital converter 314, the measured values are further processed within the controller circuit 317. In addition to the program code for evaluating the digitalised measurement signals, the circuit part 317 in particular also contains program code for sequence control of a measurement cycle, i.e. for initiating the transmission of the waves and the control of the frequencies, and the general control of the transceiver circuit 318.

The circuit assembly shown in FIG. 3 allows a complex reflection coefficient to be determined, as described. Said complex reflection coefficient is composed of all the reflection portions contained in the reception signal. If a plurality of reflectors is involved, the individual signal portions can then no longer be separated, and it is not possible to determine the distance of the individual reflectors. However, if said measurement is repeated for further set output frequencies within a specified frequency band, a digital value table consisting of the set frequency values and the associated complex reflection coefficients can be created. In the process, the frequency spacings of all the frequency values are advantageously selected so as to be the same, such that the frequency values divide the frequency band into equidistant portions. The band-limited spectrum, thus produced, of the digital reflection coefficients subsequently undergoes an inverse Fourier transform, for example an IFFT (inverse fast Fourier transform) in the case of equidistant frequency spacings, within a control circuit 317, which inverse Fourier transform transforms the frequency signal into a time signal. Said digital time signal is in turn characteristic for the sum of the reflections of the transmitted and re-received measurement signal. Said time signal is available in the form of a value table of time values and associated reflection portions and can be evaluated with respect to determining local maxima. Said local maxima characterize the individual reflections of the various reflectors received after the allotted time. In this form, said time-reflection amplitude value table now resembles the digitalised reflection profiles conventional in the known fill level radar methods. Further evaluation steps for determining the required echo from the filling material surface, and the determination of the exact moment of reflection of said echo, can therefore be adopted from the known methods of the pulsed radar or FMCW radar systems.

Characteristic variables during operation of a radar measurement device in accordance with the reflectometer method are the bandwidth $B_S$ resulting from the difference between the maximum emitted frequency and the minimum emitted frequency, and the number of intermediate frequency steps $N_{FS}$. Furthermore, the specification of the number of sampling values $N_S$ to be detected per frequency step may be significant for the efficiency of the radar system.

Figure 4:
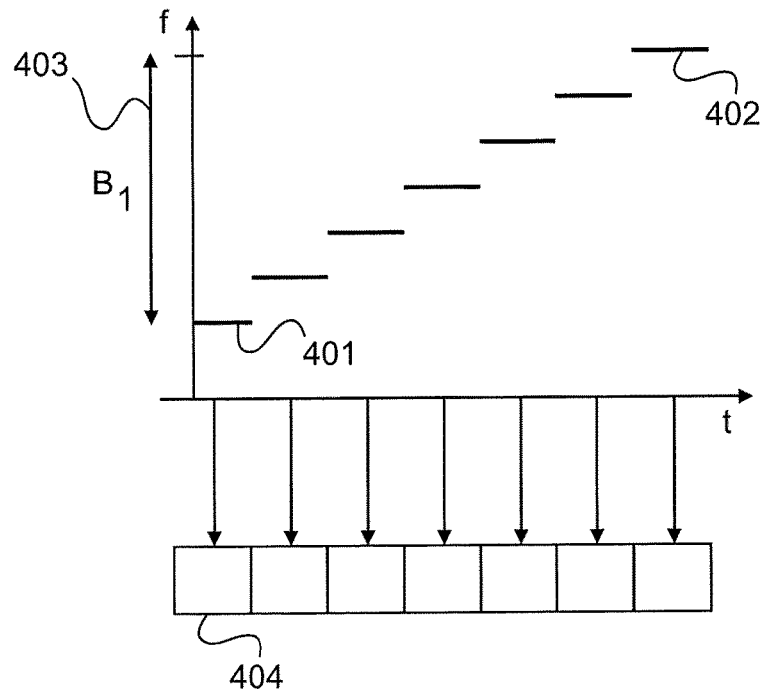
FIG. 4 shows an example of characteristic variables of a first operating mode of a reflectometer method.

FIG. 4 shows the characteristic variables of a first operating mode of a reflectometer method. The measurement begins at a first frequency 401 and ends at a second frequency 402. The difference between said two frequencies results in the bandwidth $B_1$ 403 of the system. The greater said bandwidth is selected to be, the narrower the echoes are mapped within an echo curve, which contributes to it being possible to still separately evaluate echoes that are very close together. A further parameter of the sequence according to FIG. 4 is the number of frequency steps $N_{FS}$, which has been set at seven in the present example. The higher the number of frequency steps set within the bandwidth $B_1$, the greater the measuring range of the system within which clear mapping of the reflection ratios is ensured. Furthermore, the number of analogue-to-digital conversions per frequency step influences the sensitivity of the measuring system. Detecting a plurality of individual measured values per frequency step can increase the signal-to-noise ratio within the digital signal processing. In the present example of FIG. 4, precisely one sampling value 404 is detected per frequency step.

During fill level measurement, the operating parameters can be changed using continuously or stepwise modulated FMCW or reflectometer measurement devices. In general, specialised expert knowledge is required for this, since it is not obvious to a non-specialist which of the characteristic variables set out above can be changed within what limits, and what specific effects on the measurement result from the change in the parameters.

The operating parameter adjustment means is designed to allow non-specialist users to optimise the operation of a fill level measurement device in accordance with a continuously or stepwise modulated FMCW method or reflectometer principle. Moreover, a development of the parameter adjustment means is proposed which is suitable for autonomously changing and optimising the operating parameters, within the context of the measurement, during operation of the fill level measurement device and without external intervention.

Figure 5:
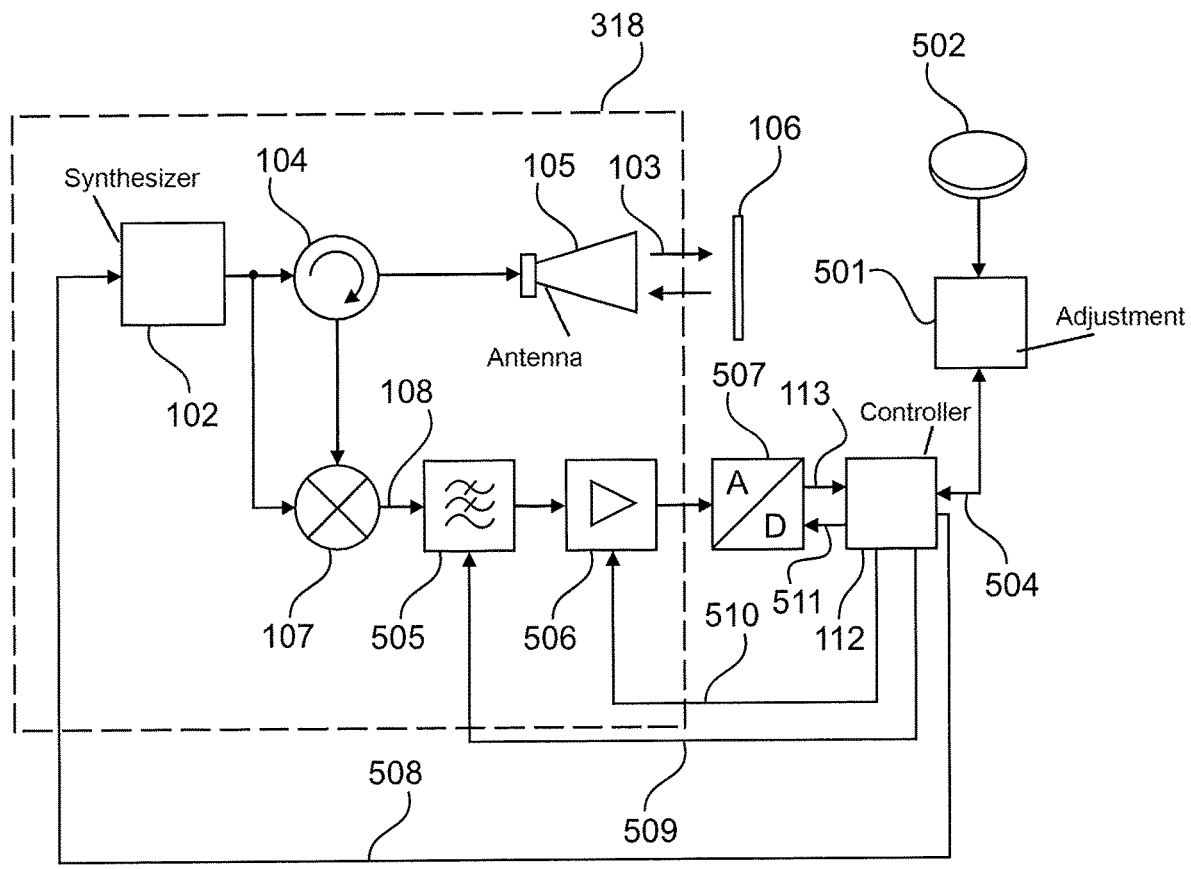
FIG. 5 is a circuit diagram of a further fill level radar device.

FIG. 5 shows a first embodiment of a modified radar device in accordance with the FMCW method. The measurement device, which corresponds in substantial portions to the known assembly from FIG. 1, comprises a parameter adjustment means 501 that can convert user parameters input by the user into requirements for the characteristic variables of the measurement sequence. The parameter adjustment means may be designed to also assume the function of an operating parameter determination means. In this case, the user can input typical characteristic variables of a measuring point via an interface unit 502 which is not necessarily part of the measurement device itself and which communicates in a wired or wireless manner with the parameter adjustment means. Within the context of the present document, said characteristic variables are also to be referred to as user parameters. In addition to conventional operating modules, PC application programs, Smartphone apps or known operating modules from process automation (e.g. HART handhelds) are possible as the interface unit. The typical characteristic variables of a measuring point describe information regarding the questions of whether, for example, a bulk material or a liquid is measured, whether a highly reflective material or a poorly reflective material is measured, whether rapid fill level changes are anticipated, whether a measurement is taken inside a vertical pipe, whether the measurement is taken at an open measuring point without a container, whether saturated vapour atmospheres are expected within the context of the measurement, and/or the size of the maximum anticipated distance range from the medium. The parameter adjustment means 501 processes the user parameters input by a user via an interface unit 502, and derives therefrom, in accordance with guidelines, characteristic variables for operating the radar measurement device in accordance with the FMCW method, for example the starting frequency used for the measurement, the measurement duration, the bandwidth as the difference between the stopping and starting frequency, the number of measured values to be detected, and other measurement parameters that can be set by the sensor electronics. The parameter adjustment means 501 can be implemented as a separate electronics unit within the sensor, for example as a logic circuit, as an FPGA, or also as a microcontroller comprising corresponding system software. It is also possible, however, for the parameter adjustment means 501 to be implemented purely as software on the previously already existing controller circuit 112, 317. It is also possible for the parameter adjustment means 501 to be provided within the interface unit 502, as hardware, software or a combined implementation.

The optimised characteristic variables for operation, determined for the relevant measurement situation by the parameter adjustment means 501 within the context of the user parameters input by the user, are communicated to the controller circuit 112, 317, for example via a communication line 504. The controller circuit 112, 317 is able, using the connections 508, 509, 510, 511, to directly influence the sequence of a measurement, i.e. in particular to set and actuate the synthesiser 102, an adjustable analogue filter 505, a settable amplifier 506 and/or the analogue-to-digital converter 507 such that it is possible to sufficiently comply with the requirements of the parameter adjustment means 501 for the characteristic variables of the radar measurement device.

At this point, it should be noted that the communication line 504 is designed for bidirectional communication. The remainder of the present document will discuss in particular the fact that the parameter adjustment means can, in addition or exclusively, also use information regarding the current measurement itself in order to determine the requirements for the characteristic variables for operating the radar measurement device.

Figure 6:
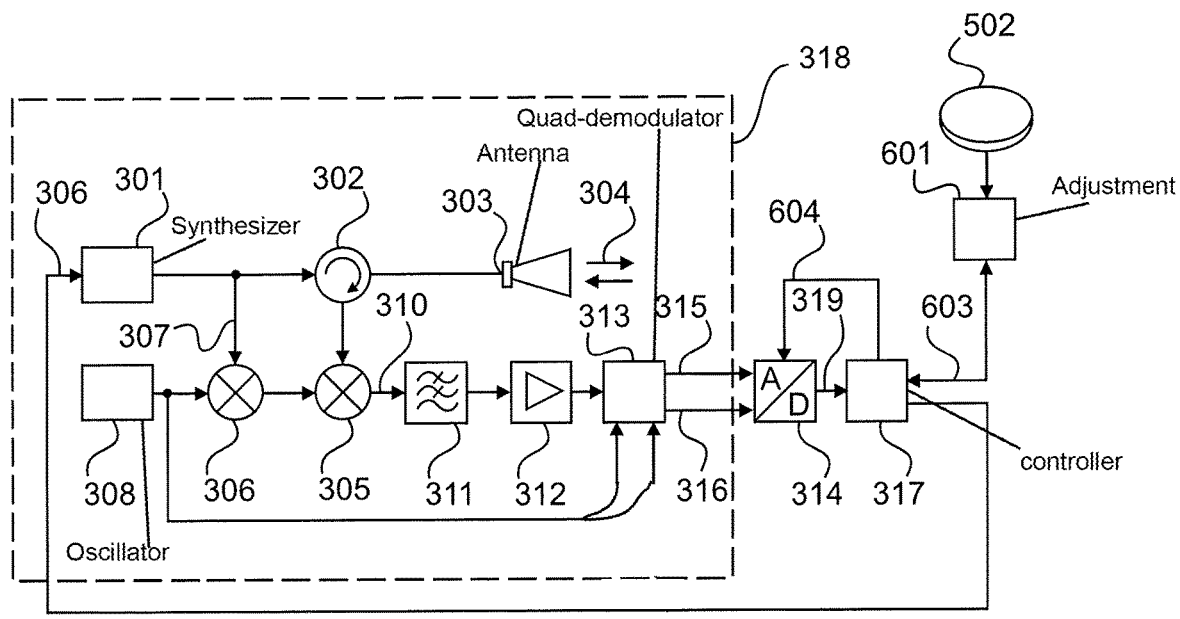
FIG. 6 is a circuit diagram of a further fill level radar device.

FIG. 6 shows a second embodiment of a modified radar device in accordance with the reflectometer principle. The measurement device, which corresponds in substantial portions to the known assembly from FIG. 3, comprises a parameter adjustment means 601 that can convert user parameters input by the user into requirements for the characteristic variables of the measurement sequence of the reflectometer. In this case, the user can input typical characteristic variables of a measuring point via an interface unit 502 which is not necessarily part of the measurement device itself and which communicates in a wired or wireless manner with the parameter adjustment means. The parameter adjustment means 601 processes the user parameters input by a user via an interface unit 502, and derives therefrom, in accordance with the guidelines, characteristic variables for operating the radar measurement device in accordance with the reflectometer method, for example the single frequency values to be actuated for the measurement, the bandwidth as the difference between the highest measurement frequency and the lowest measurement frequency, the number of sampling values to be detected per measurement frequency. The parameter adjustment means 601 can be implemented as a separate electronics unit within the sensor, for example as a logic circuit, as an FPGA, or also as a microcontroller comprising corresponding system software. It is also possible, however, for the parameter adjustment means 601 to be implemented purely as software on the previously already existing controller circuit 317. It is also possible for the parameter adjustment means 601 to be provided within the interface unit 502, as hardware, software or a combined implementation.

The optimised characteristic variables for operation, determined for the relevant measurement situation by the parameter adjustment means 601 within the context of the user parameters input by the user, are communicated to the controller circuit 317, for example via a communication line 603. The controller circuit 317 is able, using the connection lines 306, 604, to directly influence the sequence of a measurement, i.e. in particular to set and actuate the synthesiser 301 and/or the analogue-to-digital converter 314 such that it is possible to sufficiently comply with the requirements of the parameter adjustment means 601 for the characteristic variables of the radar measurement device.

At this point, it should be noted that the communication line 603 is designed for bidirectional communication. The remainder of the present document will discuss in particular the fact that the parameter adjustment means can, in addition or exclusively, also use information regarding the current measurement itself in order to determine the requirements for the characteristic variables for operating the radar measurement device.

Figure 7:
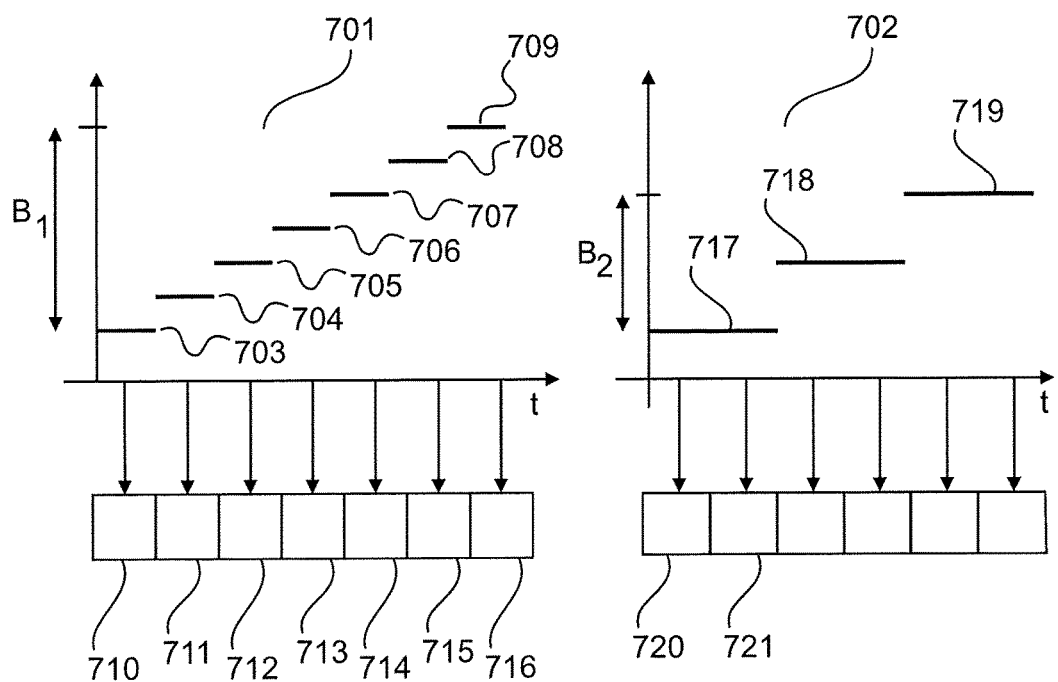
FIG. 7 shows the operating principle when changing the characteristic variables.

FIG. 7 shows, with reference to a fill level measurement device in accordance with the reflectometer principle, the operating principle when changing the characteristic variables for operating the device. If the user does not input typical characteristic variables of the measuring point, the measurement device may be in a delivery state in which it generates seven different single frequency values 703 ... 709 using a synthesiser 301. The high-frequency bandwidth B1 resulting from this measurement results from the difference between the highest transmitted frequency 709 and the lowest transmitted frequency 703. The measurement device may be programmed in the factory configuration so as to detect precisely one complex-valued measured value 710, 711, ..., 716, using the analogue-to-digital converter 314, for each of the single frequency values 703 ... 709 that are set in temporal succession. The distance from the filling material can be determined from the detected measured values 710 ... 716 in a known manner.

If, within the context of parameterisation of the measurement device, the user for example provides the information that the measurement is to take place inside a container comprising a poorly reflective bulk material, this information is used by the parameter adjustment means 601 in order to change the characteristic variables for operation in accordance with the depiction 702. In the case of bulk material applications, it is generally the case that the echoes from the bulk material surface are very wide due to cones that develop. It is therefore obvious to change the measurement sequence so as to pass through a smaller bandwidth B2. Although this also results in wider echoes, the energy consumption, and thus the measurement repetition rate, can be optimised by such a measure. Moreover, the information regarding the poor reflectivity of the medium is used in that a plurality of measured values 720, 721 are detected for each transmitted frequency step 717, 718, 719. Calculating, within the controller circuit 317, the average of the measured values associated with one frequency step makes it possible to reduce the noise portion within the detected measured values and thus to improve the measuring reliability in the case of poorly reflective media.

The further figures illustrate further example relationships that are stored in the parameter adjustment means 501, 601 as a priori knowledge. In order not to complicate the description too much, the explanations are restricted to the FMCW principle. It should be explicitly noted at this point that a person skilled in the art can easily also transfer the corresponding findings to a parameter adjustment means for a radar measurement device in accordance with the reflectometer principle. A first example has been set out in FIG. 7.

Figure 8:
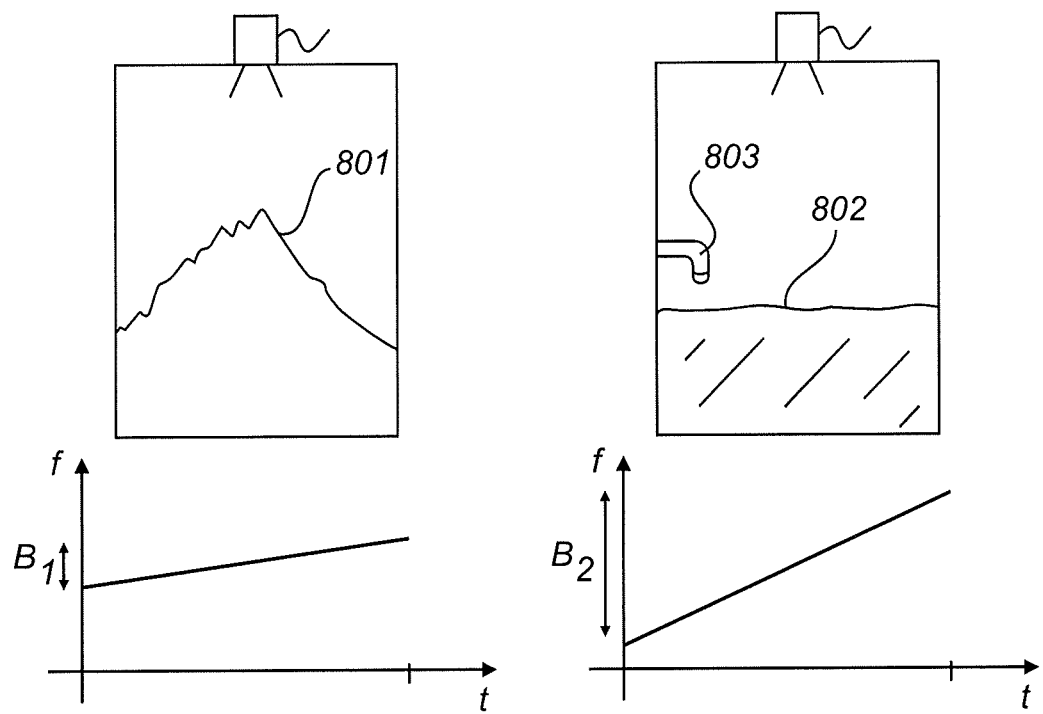
FIG. 8 shows the relationships between typical variables of a measurement assembly and the characteristic variables of the measurement sequence of the fill level radar device.

The following explanations regarding FIGS. 8 to 14 set out relationships, by way of example, between the typical variables of a measuring point and the characteristic variables of the measurement sequence of the radar measurement device. FIG. 8 shows the change in the case of a selection between a measurement on bulk material 801 and a measurement on liquids 802, as can be input by the user via a user interface 502. In the case of a measurement on bulk material, in general very wide cone echoes are measured for physical reasons. Separating echoes that are very close together is therefore not particularly useful. It is therefore advantageous to select the measurement bandwidth B1 so as to be very small. In contrast, in the case of liquid applications, setting a very large measurement bandwidth B2 makes it possible for the measurement device to detect very narrow echoes. It is therefore possible in particular to separate the echo from a pipeline 803 and the echo from the liquid surface 802, which echoes are spatially very close together, and to thus increase the measuring accuracy.

Figure 9:
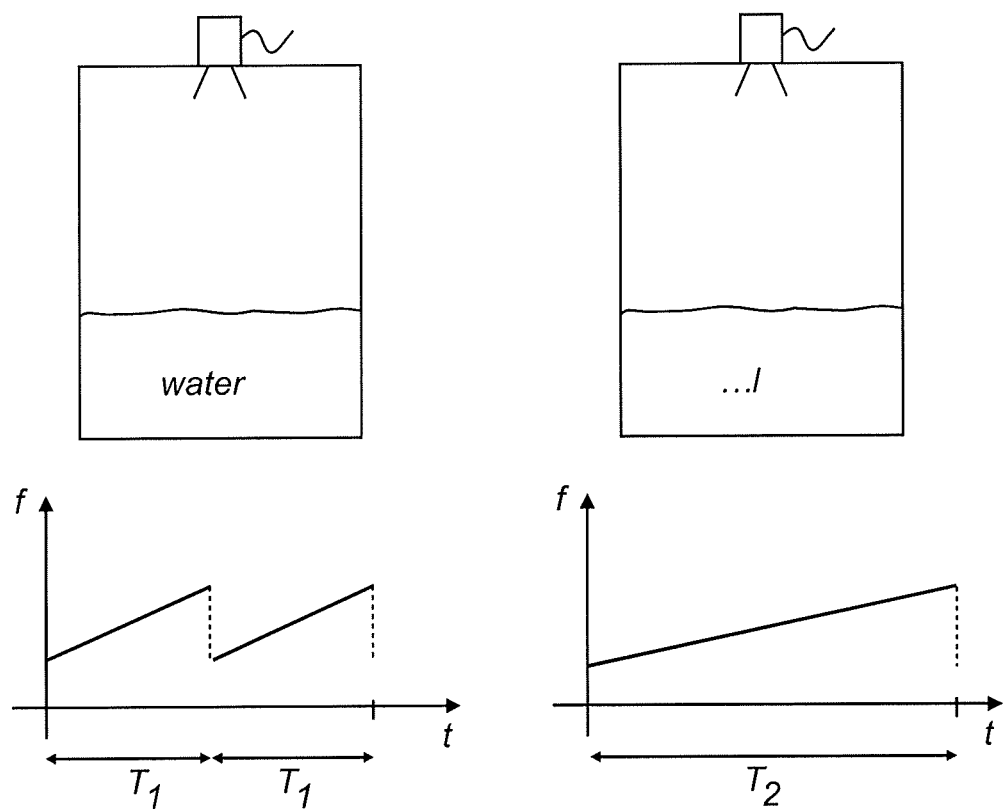
FIG. 9 shows another example.

FIG. 9 shows the changes that result in the operating sequence when a user option for poorly reflective media is activated. In the standard sequence, the control software within the fill level measurement device assumes that the reflection properties of the medium are in the conventional range of the media spectrum. Accordingly, a short measurement time T1 is set which ensures that a very large number of measurements can bring about a quick reaction time of the device in the case of a changing fill level. If, in contrast, the option for poorly reflective media (for example in the case of oil) is activated, the measurement device thus changes its operating sequence such that very long measurement times T2 are set. Although this reduces the measurement repetition rate, it also ensures that noise portions during detection of the measured values are very small, which significantly increases the reliability of the measurement in the case of a previously small useful signal.

Figure 10:
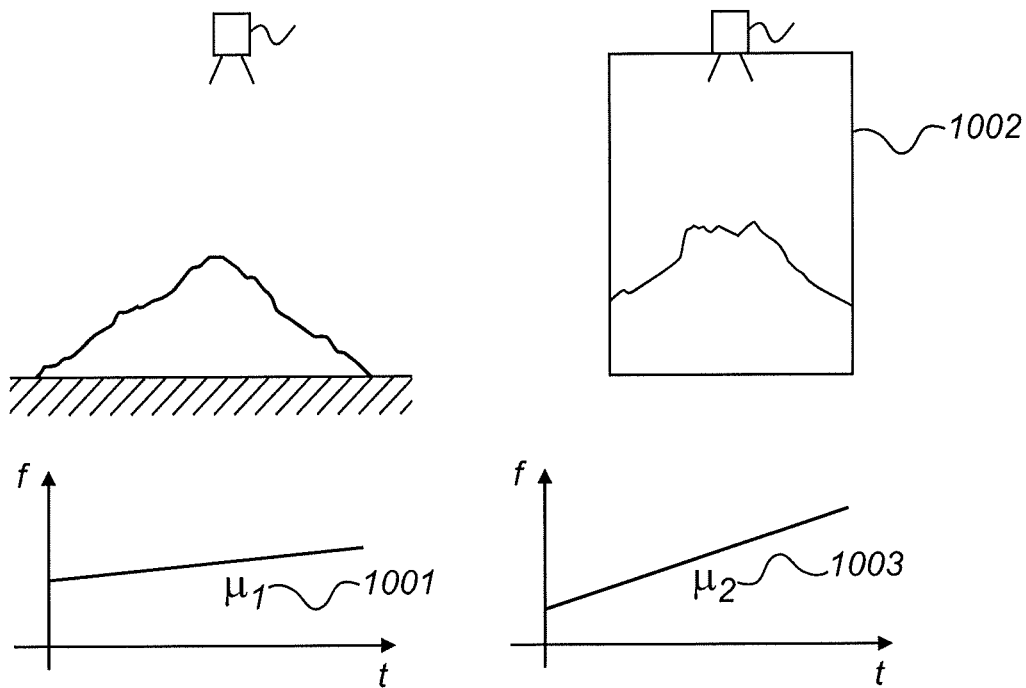
FIG. 10 shows another example.

FIG. 10 illustrates a more legal aspect during operation of fill level measurement devices. Depending on the radio authorisation norms in different countries, some fields require radar measurement devices that are operated outside closed containers to comply with specific requirements relating to the sweep rate in order to ensure that other communications devices are not subject to interference. One scenario results from the user input "measurement outside a container".

In this case, the parameter adjustment means changes the measurement sequence such that a maximum permissible sweep rate u1 1001 is not exceeded. In the case of measurement in a closed container 1002, said requirement can be ignored, and therefore a higher sweep rate u2 1003 is advantageously set. As a result, the measurement time can be reduced and therefore the measurement repetition rate in closed containers can be improved. At the same time, in the event of corresponding user input, a fill level radar device meets the requirements for operation outside closed containers.

Figure 11:
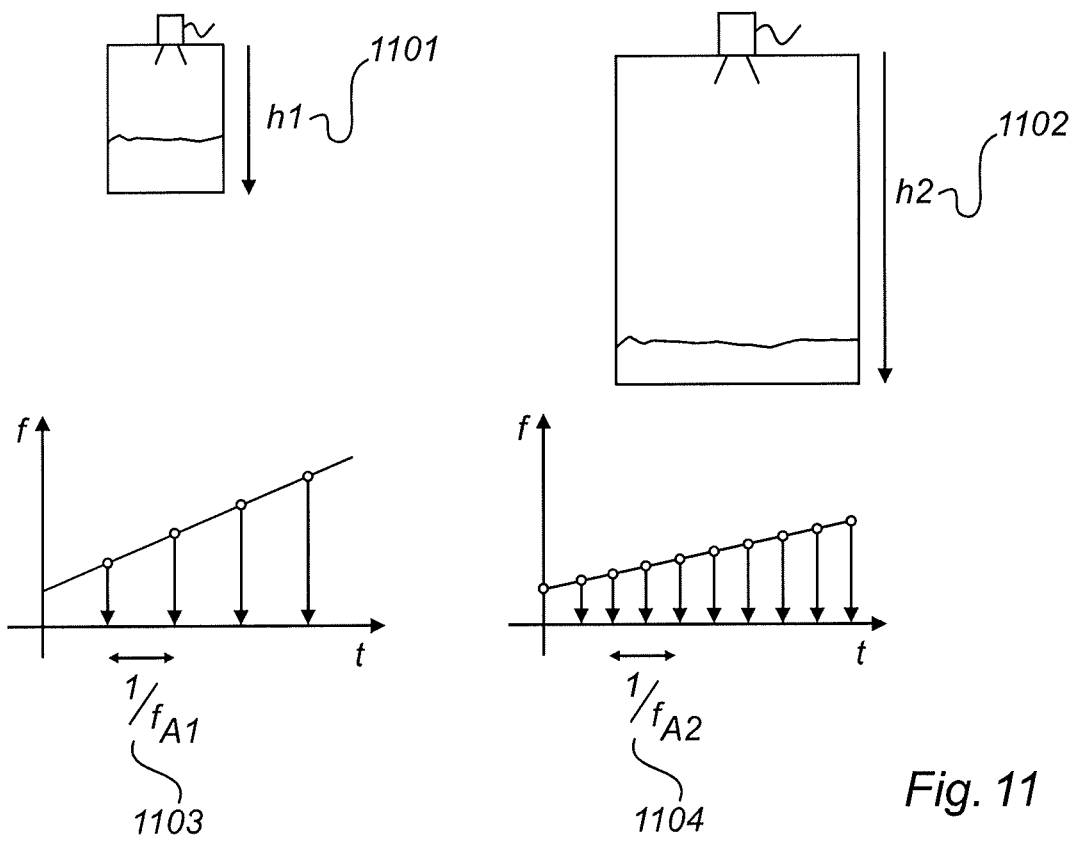
FIG. 11 shows another example.

FIG. 11 shows the changing operating sequences when the height of the container to be measured is input. In the case of a small container 1101 having a height of h1, processing echoes in a range far from the maximum distance h1 can be omitted. The parameter adjustment means uses the relationship whereby echoes at a very great distance are reproduced in high frequencies of the intermediate frequency signal 108, whereas echoes that are closer contribute only to low frequencies of the signal. Accordingly, in the example of a small container height 1101, the processing chain consisting of the band-pass filter 505, amplifier 506 and A/D converter 507 can be set to the low maximum frequency. This in particular makes it possible to operate the A/D converter 507 at a low sampling frequency fA1 1103. As a result of fewer detected sampling values per measurement cycle, the computing complexity within the digital signal processing is reduced, contributing to a very short measurement duration and thus a high measurement repetition rate. In contrast thereto, in the case of large containers 1102, high frequency portions for distant echoes should be anticipated. The processing chain consisting of the band-pass filter 505, amplifier 506 and A/D converter 507 must be set to the high maximum frequency, and the sampling frequency FA2 1104 must also be increased correspondingly.

Figure 12:
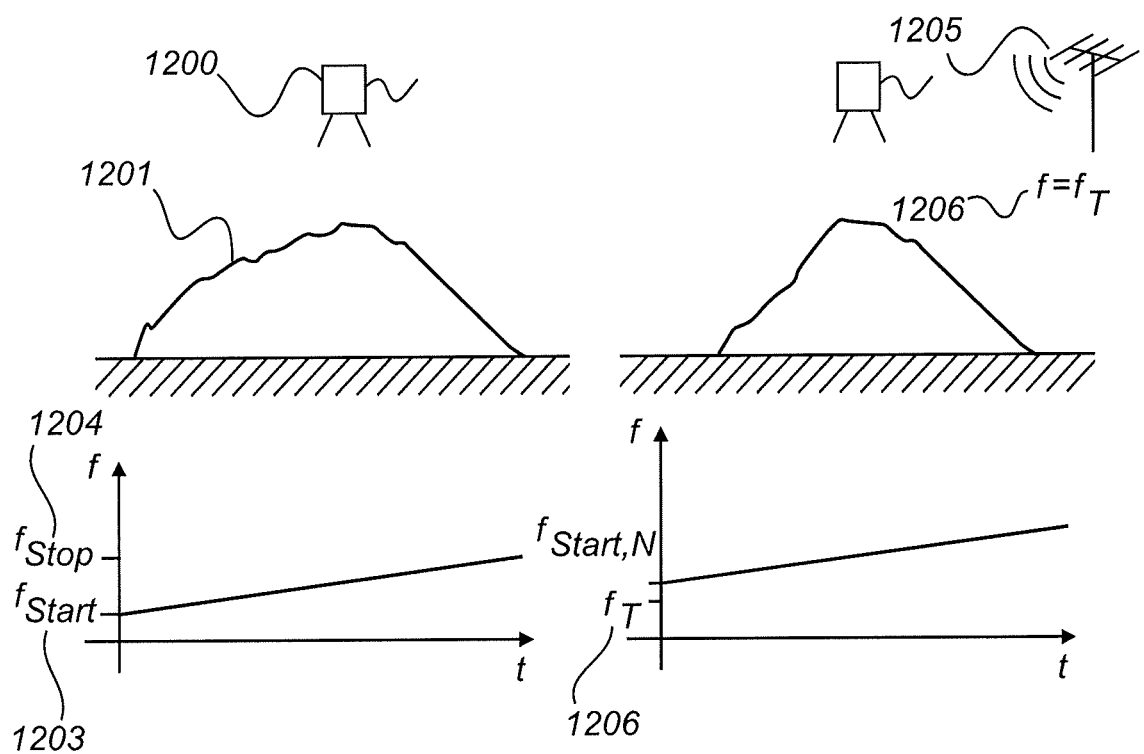
FIG. 12 shows another example.

FIG. 12 shows an embodiment in which the parameter adjustment means 501, 601 autonomously optimises the characteristic parameters for operating the measurement device, without any specification by the user. The measurement device may first carry out a free field measurement on a bulk material cone 1201. The parameters used for this purpose, in particular the starting frequency fStart 1203 and the stopping frequency fStop 1204, are programmed into the firmware of the measurement device at the factory. As a result of external interference, for example a transmitting antenna 1205 mounted close to the measurement device, the situation may arise in which the measurement is subject to interference in at least a portion of the bandwidth fStart fStop. The measurement device can determine, by means of plausibility analyses and/or by switching to a purely receiving mode, that a measurement on a carrier frequency fT 1206 radiated in externally is possible only with difficulty. The parameter adjustment means, which receives, from the controller circuit, the information regarding the presence of interference in a portion of the measurement band currently used, can then independently change the frequencies used for the measurement such that the external interference frequency is outside the range of the measurement frequencies. In the present example, the parameter adjustment means increases the starting frequency to a value above the external interference frequency, which can lead to interference-free operation of the measurement device.

Figure 13:
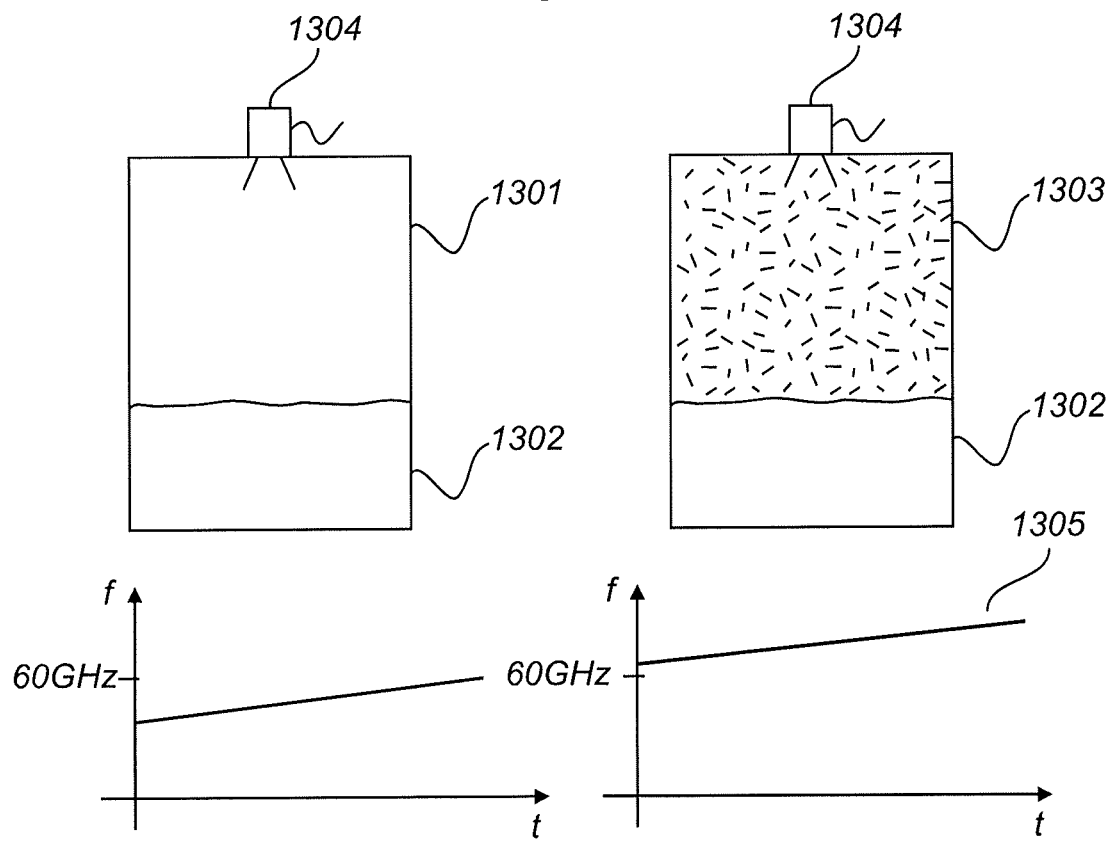
FIG. 13 shows another example.

A further example for automatic optimisation of the operating parameters by means of a parameter adjustment means is illustrated in FIG. 13. In contrast to free field measurement, external interference frequencies occur only rarely in the case of measurement inside closed containers 1301. In particular when measuring ammonia or water at a very high pressure and/or very high temperature, a saturated vapour atmosphere 1303 forms above the actual medium 1302, which atmosphere greatly attenuates the electromagnetic waves emitted by the measurement device 1304 in at least a portion of the emitted frequencies. In the case of water, it is known, for example, that a saturated vapour atmosphere greatly attenuates electromagnetic waves in the range of around 60 GHz. In order to prevent the loss of the useful signal, and thus a decrease in the signal-to-noise ratio, in corresponding applications, the parameter adjustment means can always displace the frequency band used for the measurement when it identifies a decrease in the detected signal energy in a portion of the emitted frequencies. The operating sequence according to the depiction 1305 illustrates the change in the measurement sequence when attenuation effects occur, at a frequency of 60 GHz.

It is also possible for a static change in the operating frequencies of the radar measurement device to be undertaken by the parameter adjustment means, by means of the user inputting the operating pressure, medium and operating temperature.

Figure 14:
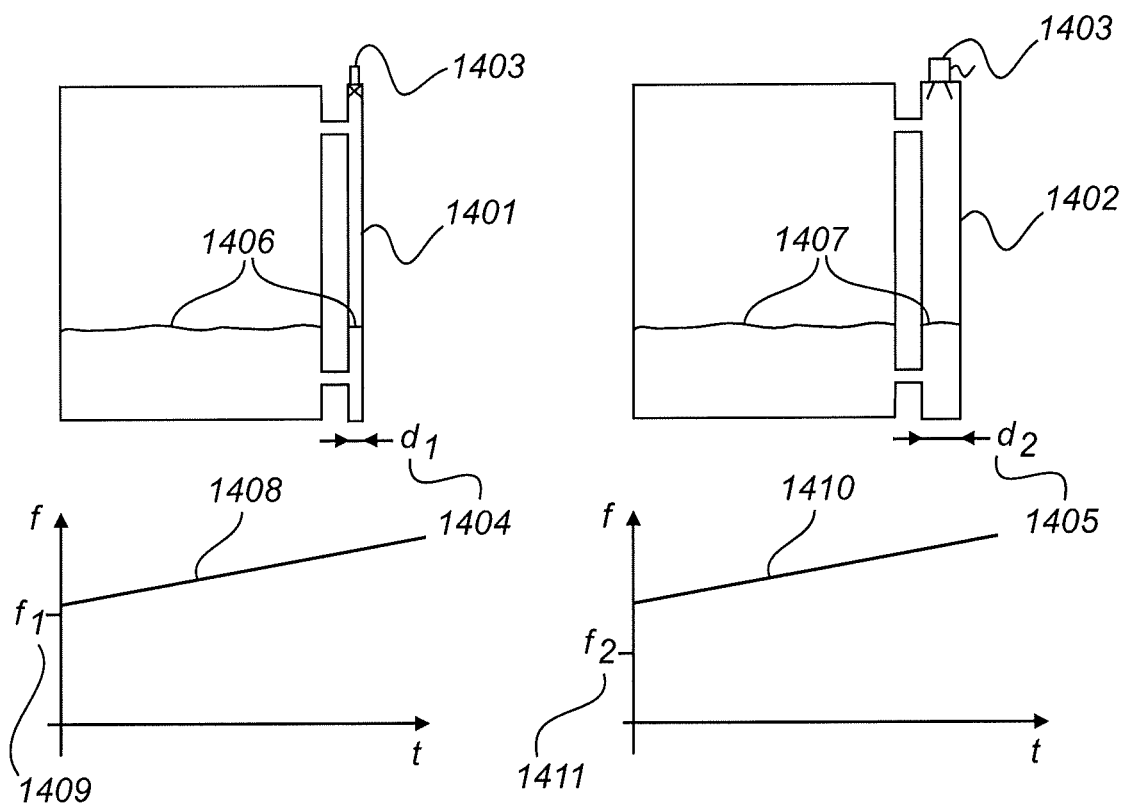
FIG. 14 shows another example.

FIG. 14 shows another embodiment. In particular in the case of measurement in what are known as bypass pipes 1401, 1402 using free-beam radar measurement devices 1403, the problem arises that the bypass pipe acts as what is known as a hollow waveguide for the electromagnetic signals. Depending on the inner diameter 1404, 1405 of the bypass pipe, electromagnetic waves having a frequency below the cutoff frequency of the hollow waveguide do not propagate towards the filling material surface 1406, 1407 at all or propagate towards said surface only in a greatly attenuated manner. After the user has input the information regarding a measurement in the vertical pipe and after said user has input the diameter of the vertical pipe, the parameter adjustment means can take said behaviour into account and thus optimise the measurement sequence. Using the parameters for the vertical pipe 1401, the parameter adjustment means can autonomously determine the value for the cutoff frequency f1. In order to optimise the course of the measurement, in particular the starting frequency of the measurement 1408 is set to a value above the cutoff frequency f1 1409 of the vertical pipe 1401. In the case of a different pipe diameter 1405 of a second vertical pipe 1402, a lower cutoff frequency f2 1411 results compared with the example above, and therefore the parameter adjustment means actuates a measurement sequence 1410 having a starting frequency that is lower but that is in turn above the second cutoff frequency f2.

Figure 15:
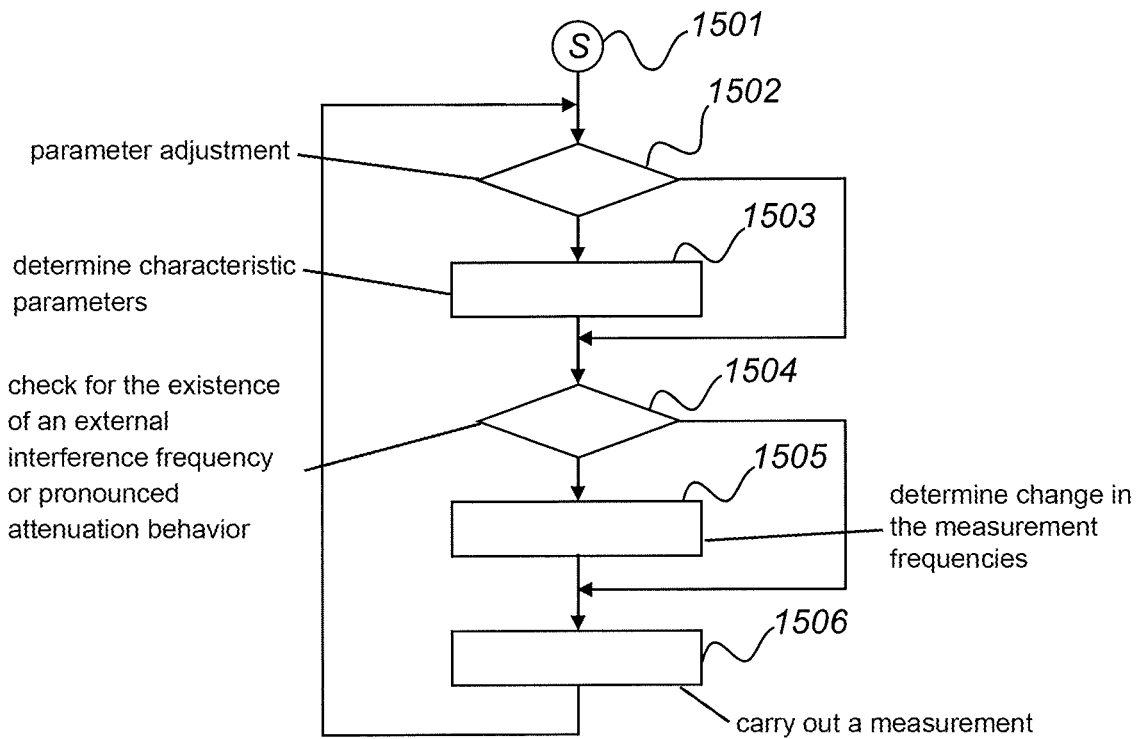
FIG. 15 is a flow chart of a method according to an embodiment.

FIG. 15 shows an operating sequence of a measurement device in accordance with the FMCW method or in accordance with the reflectometer method. The method starts in the starting state 1501. In step 1502, the parameter adjustment means 501, 601 first checks whether new parameters have been input by the user via an interface 502. If this is the case, characteristic parameters for operating the measurement device are determined on the basis of the user parameters and are communicated to the controller unit. In step 1504, the parameter adjustment means checks for the existence of an external interference frequency or pronounced attenuation behaviour of individual frequencies in the frequency range currently used for the measurement. If this is the case, in step 1505 a change in the measurement frequencies to be actuated is determined and communicated to the controller unit. In step 1506, the controller unit carries out a measurement on the basis of the requirements of the parameter adjustment unit and determines the spacing from the filling material. The determined spacing is made available to the outside.

With regard to the block diagrams and the schematic drawings, it should be noted in general that they are reduced to the essential components, and components required for practical implementation have been omitted in part or simplified since they are known to a person skilled in the art. This applies, for example, to filtering measures at the outlet of the mixer in order to allow through only the desired mixed frequencies and to suppress undesired mixed products. Moreover, it is routine for a person skilled in the art to amplify signals at different points of the signal chain if necessary, in order to increase the signal-to-noise ratio. This may, for example, be amplifiers in the transmitting branch or the receiving branch ahead of the receiving mixer. Furthermore, only the part of the sensor circuit that is important for the direct measurement technique has been shown here. A fill level radar sensor constructed according to this principle can of course contain further circuit parts known to a person skilled in the art.

It should furthermore be noted that the methods and devices set out above can be used both for fill level measurement devices in accordance with the continuously or stepwise modulated FMCW methods and for fill level measurement radar devices in accordance with the reflectometer principle. It is obvious to a person skilled in the art how the corresponding embodiments can also be used for other principles.

It should furthermore be noted that the relationships between the embodiments that have been set out are not complete. In the case of the continuously or stepwise modulated FMCW method, it is possible in particular to consider making any change in the sweep parameters dependent on the user inputs. It is possible to sweep from a low frequency to a high frequency. It is possible to sweep from a high frequency to a low frequency. It is also possible to split the sweep into a plurality of partial sweeps, omitting individual frequencies. In particular in the case of the fill level measurement device in accordance with the reflectometer method, it is possible to pass in any desired order through the amount of transmission frequencies to be actuated, and to organise the resulting measured values back into the correct order in the memory by means of sorting.

For the sake of completeness, it should be noted that "comprising" and "having" do not exclude the possibility of other elements or steps, and the indefinite article "a", or "one", does not exclude the possibility of a plurality. It should further be pointed out that features or steps described with reference to one of the above embodiments may also be used in combination with other features or steps of other above-described embodiments. Reference signs in the claims should not be treated as limiting.

The invention claimed is:

1. A fill level radar device, comprising:
a signal source assembly configured to generate an electromagnetic continuous wave transmission signal, a duration of a period of which is more than twice a delay time of a transmission signal from the signal source assembly to a filling material;
an operating parameter determination circuit configured to determine a new sweep parameter of the electromagnetic continuous wave transmission signal taking into account user input; and
an operating parameter adjustment circuit configured to change a sweep parameter of the electromagnetic continuous wave transmission signal to the new sweep parameter,
wherein the user input includes information regarding a classification of the filling material, a classification of the measurement setup, or an expected rate of change of the fill level.

2. The fill level radar device according to claim 1,
wherein the user input is a characteristic variable of a measurement environment or a measurement sequence.

3. The fill level radar device according to claim 2,
wherein the sweep parameter of the electromagnetic continuous wave transmission signal is a number of frequency steps of the electromagnetic continuous wave transmission signal or a number of sampling values to be detected per frequency step.

4. The fill level radar device according to claim 2,
wherein the sweep parameter of the electromagnetic continuous wave transmission signal is a power of the electromagnetic continuous wave transmission signal depending on a frequency of the electromagnetic continuous wave transmission signal.

5. The fill level radar device according to claim 2, further comprising:
a transceiver circuit configured to:
transmit the electromagnetic continuous wave transmission signal towards a filling material surface;
receive a transmission signal reflected by the filling material surface and mix the received reflected electromagnetic continuous wave transmission signal with a further signal in order to form a reflection-dependent reception signal from which a fill level is determinable.

6. The fill level radar device according to claim 2,
wherein the electromagnetic continuous wave transmission signal has a frequency that is constant for a predetermined period of time, and wherein individual frequencies are distributed within a defined frequency band.

7. The fill level radar device according to claim 1, wherein the sweep parameter of the electromagnetic continuous wave transmission signal is a sweep time of the electromagnetic continuous wave transmission signal, a bandwidth thereof, a starting frequency thereof, a stopping frequency thereof, or a sampling rate of an analogue-to-digital converter.

8. The fill level radar device according to claim 1, wherein the sweep parameter of the electromagnetic continuous wave transmission signal is a number of frequency steps of the electromagnetic continuous wave transmission signal or a number of sampling values to be detected per frequency step.

9. The fill level radar device according to claim 1, wherein the sweep parameter of the electromagnetic continuous wave transmission signal is a power of the electromagnetic continuous wave transmission signal depending on a frequency of the electromagnetic continuous wave transmission signal.

10. The fill level radar device according to claim 1, further comprising:
a transceiver circuit configured to:
transmit the electromagnetic continuous wave transmission signal towards a filling material surface;
receive a transmission signal reflected by the filling material surface and mix the received reflected electromagnetic continuous wave transmission signal with a further signal in order to form a reflection-dependent reception signal from which a fill level is determinable.

11. The fill level radar device according to claim 1, wherein the electromagnetic continuous wave transmission signal has a frequency that is constant for a predetermined period of time, and
wherein individual frequencies are distributed within a defined frequency band.

12. The fill level radar device according to claim 1, wherein the sweep parameter of the electromagnetic continuous wave transmission signal is a number of frequency steps of the electromagnetic continuous wave transmission signal or a number of sampling values to be detected per frequency step.

13. The fill level radar device according to claim 1, wherein the sweep parameter of the electromagnetic continuous wave transmission signal is a power of the electromagnetic continuous wave transmission signal depending on a frequency of the electromagnetic continuous wave transmission signal.

14. The fill level radar device according to claim 1, further comprising:
a transceiver circuit configured to:
transmit the electromagnetic continuous wave transmission signal towards a filling material surface;
receive a transmission signal reflected by the filling material surface and mix the received reflected electromagnetic continuous wave transmission signal with a further signal in order to form a reflection-dependent reception signal from which a fill level is determinable.

15. The fill level radar device according to claim 1, wherein the electromagnetic continuous wave transmission signal has a frequency that is constant for a predetermined period of time, and
wherein individual frequencies are distributed within a defined frequency band.

16. A method for fill level determination, comprising:
generating an electromagnetic continuous wave transmission signal, the duration of a period of which is more than twice a delay time of a transmission signal from a signal source assembly to a filling material;
determining a new sweep parameter of the electromagnetic continuous wave transmission signal taking into account user input; and
changing a sweep parameter of the electromagnetic continuous wave transmission signal to the new sweep parameter,
wherein the user input includes information regarding a classification of the filling material, a classification of the measurement setup, or an expected rate of change of the fill level.

17. A non-transitory computer-readable medium storing a program element that when executed by a processor causes the processor to implement a method for fill level determination, comprising:
generating an electromagnetic continuous wave transmission signal, the duration of a period of which is more than twice a delay time of a transmission signal from a signal source assembly to a filling material;
determining a new sweep parameter of the electromagnetic continuous wave transmission signal taking into account user input; and
changing a sweep parameter of the electromagnetic continuous wave transmission signal to the new sweep parameter,
wherein the user input includes infonnation regarding a classification of the filling material, a classification of the measurement setup, or an expected rate of change of the fill level.

* * * * *